United States Patent [19]
Tilly et al.

[11] Patent Number: 5,801,624
[45] Date of Patent: Sep. 1, 1998

[54] BRAKE INDICATING APPARATUS AND METHOD

[75] Inventors: Lynn K. Tilly, Oxford; Robert C. Kittle, Lake Orion; Paul E. Olinzock, Clinton Township; Jeffrey C. Vogel, Royak Oak, all of Mich.

[73] Assignee: Chrysler Corporation, Auburn Hills, Mich.

[21] Appl. No.: 949,158

[22] Filed: Oct. 10, 1997

[51] Int. Cl.$^6$ ............................................. B60Q 1/44
[52] U.S. Cl. ............ 340/479; 340/467; 188/1.11 E; 303/138; 307/10.8; 315/77
[58] Field of Search .................. 340/479, 467, 340/463, 468, 464, 466, 471, 472, 473, 476, 477, 478; 188/1.11 E; 303/138, 199; 307/10.8; 315/77, 80

[56] References Cited

U.S. PATENT DOCUMENTS

| | | |
|---|---|---|
| 3,460,089 | 8/1969 | Gregory . |
| 3,629,815 | 12/1971 | Hattwig . |
| 3,760,353 | 9/1973 | Hassinger . |
| 4,663,609 | 5/1987 | Rosario . |
| 4,876,525 | 10/1989 | Gross . |
| 4,983,952 | 1/1991 | Athalye . |
| 4,990,887 | 2/1991 | Lee .................................... 340/479 |
| 5,017,904 | 5/1991 | Brown et al. . |
| 5,139,115 | 8/1992 | Browne et al. .................... 340/479 |
| 5,231,373 | 7/1993 | Freeman et al. .................. 340/479 |
| 5,345,218 | 9/1994 | Woods et al. . |
| 5,373,426 | 12/1994 | O'Sullivan . |
| 5,376,918 | 12/1994 | Vinciguerra et al. ............. 340/479 |
| 5,404,130 | 4/1995 | Lee et al. . |
| 5,426,418 | 6/1995 | Furgeson et al. ................. 340/479 |
| 5,434,554 | 7/1995 | Caesar . |
| 5,442,333 | 8/1995 | Bailey . |
| 5,461,362 | 10/1995 | Echt . |
| 5,491,466 | 2/1996 | Maiocco, Sr. ..................... 340/479 |
| 5,504,472 | 4/1996 | Wilson . |

Primary Examiner—Nina Tong
Attorney, Agent, or Firm—Roland A. Fuller, III

[57] ABSTRACT

A brake indicating apparatus for indicating braking of a vehicle having an anti-lock braking system (ABS) and brake lights powered upon actuation of a vehicle brake pedal including ABS input for sensing ABS actuation during braking of a vehicle and for producing an ABS signal, a warning switch for receiving a flash signal and for temporarily interrupting power to the brake lights, a warning module for receiving the ABS signal and for producing the flash signal to activate the warning switch, and the warning module including a delay circuit and a severity circuit for delaying activation of the warning switch for a predetermined time after reception of the ABS signal.

19 Claims, 4 Drawing Sheets

BRAKE INDICATING APPARATUS AND METHOD

BACKGROUND OF THE INVENTION

1. Field of the Invention

The present invention relates generally to vehicle brake lights and, more particularly, to a brake indicating apparatus and method of operating vehicle brake lights during anti-lock braking system (ABS) engagement.

2. Description of the Related Art

Brake lights have been used to warn vehicles following behind a vehicle when the vehicle is stopping. In poor road surface conditions, drivers have had to pump their brakes in order to attempt stopping of the vehicle. This, in turn, provided flashing of the brake lights, which would warn others following behind the vehicle that there were poor road surface conditions. However, with the introduction of anti-lock braking systems (ABS), the pumping of brakes is infrequent. Anti-lock braking systems automatically pump the brakes during slipping conditions, as required, to maintain traction with the road surface. The driver, in this condition, merely depresses the vehicle brake pedal and continues to hold the vehicle brake pedal down while the brakes are pumped by the ABS system. During this condition, typically, there has been no flashing of the brake lights with the pumping of the brakes, but only continuous lighting of the brake lights.

Systems have been developed to address the problem of warning following vehicles of brake pumping during ABS engagement. For example, U.S. Pat. No. 4,876,525 to Gross discloses an emergency warning brake system for use with ABS. The input signal flashes a brake light at the same rate that the brake is pulsated. In this condition, only the center or third brake light is flashed. However, there is a need in the art to provide an improved braking apparatus and method of operating vehicle brake lights during ABS engagement.

SUMMARY OF THE INVENTION

It is, therefore, one object of the present invention to provide a brake indicating apparatus for a vehicle having an anti-lock braking system.

It is another object of the present invention to provide a method of indicating braking of a vehicle having an anti-lock braking system during ABS engagement.

To achieve the foregoing objects, the present invention is a brake indicating apparatus for indicating braking of a vehicle having an anti-lock braking system (ABS) and brake lights powered upon actuation of a vehicle brake pedal. The brake indicating apparatus includes ABS input for sensing ABS actuation during braking of a vehicle and for producing an ABS signal. The brake indicating apparatus also includes a warning switch for receiving a flash signal and for temporarily interrupting power to the brake lights. The brake indicating apparatus further includes a warning module for receiving the ABS signal and for producing the flash signal to activate the warning switch. The warning module includes a delay circuit and a severity circuit for delaying activation of the warning switch for a predetermined time after reception of the ABS signal.

Additionally, the present invention is a method of indicating braking of a vehicle having an anti-lock braking system (ABS) and brake lights powered upon actuation of a vehicle brake pedal. The method includes the steps of detecting ABS actuation during braking of the vehicle and producing an ABS signal and receiving a flash signal to temporarily interrupt power to the brake lights. The method also includes the steps of receiving the ABS signal and providing the flash signal. The method also includes the steps of delaying activation of the flash signal and delaying activation of the flash signal for a predetermined time after reception of the ABS signal.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 2 is a circuit diagram of a warning module of the braking indicating apparatus of FIG. 1.

DESCRIPTION OF THE PREFERRED EMBODIMENT(S)

Figure 1:
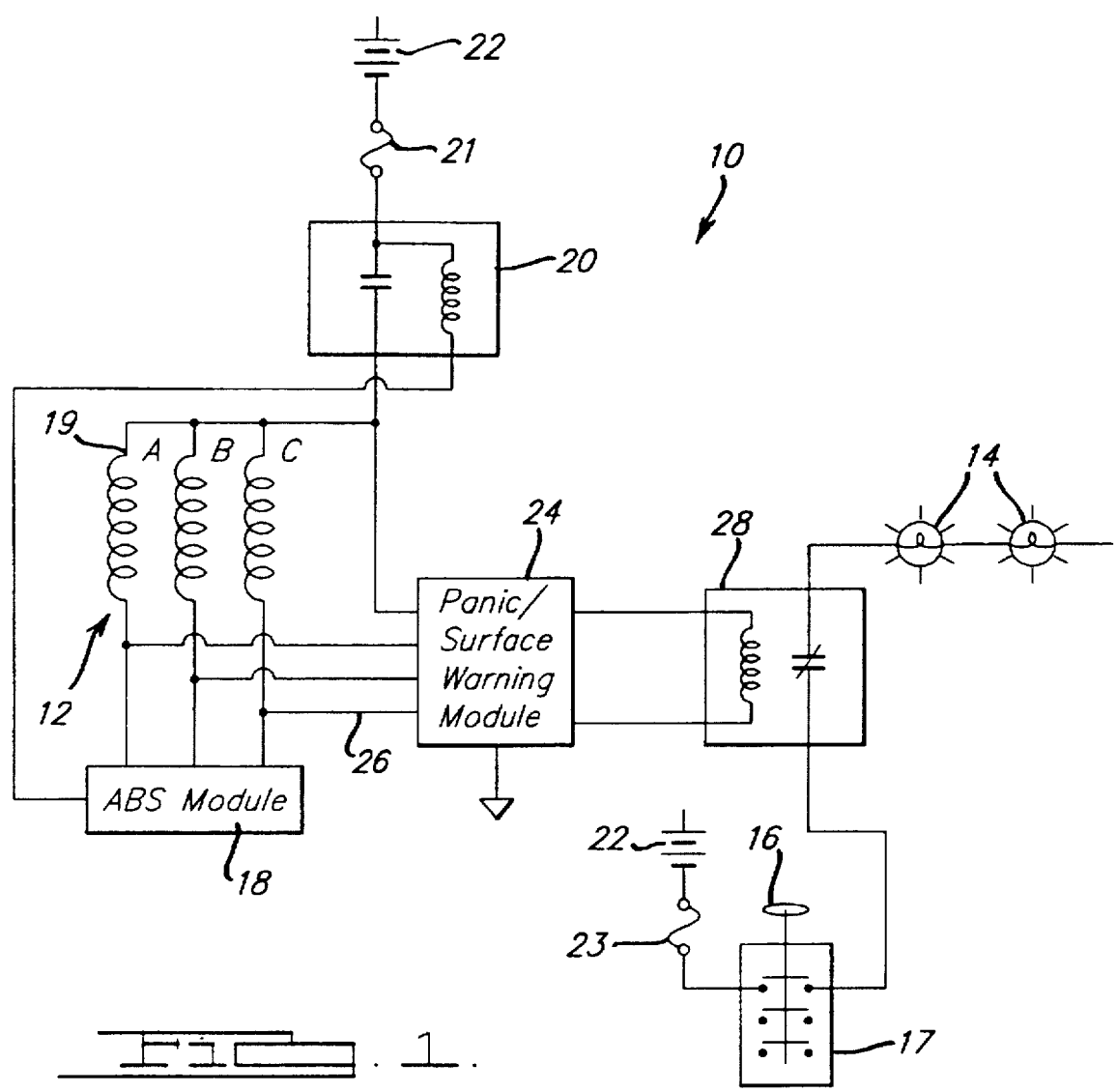
FIG. 1 is a schematic diagram of a brake indicating apparatus, according to the present invention, illustrated in operational relationship with a brake system of a vehicle.

Referring to FIG. 1, one embodiment of a brake indicating apparatus 10, according to the present invention, is illustrated in operational relationship with an anti-lock braking system (ABS) 12 and brake lights 14 powered upon actuation of a vehicle brake pedal 16 of a motor vehicle (not shown). The brake indicating apparatus 10 indicates braking conditions have surpassed a calibratable threshold of the motor vehicle. As commonly known, the ABS 12 includes an ABS module 18 which pulses vehicle brakes (not shown) of the motor vehicle many times per second to avoid loss of control and traction of tires (not shown) of the motor vehicle with a road surface. The ABS module 18 senses slippage or loss of traction of the tires, and goes into a pumping mode to pump the brakes. The ABS module 18 is connected to a plurality of ABS solenoids 19 which receive an output signal from the ABS module 18 to cause pumping of the brakes in response to control by the ABS module 18, and through a main relay 20 and fuse 21 to a vehicle battery 22, as commonly known in the art. It should be appreciated that the ABS 12 is conventional and known in the art.

The vehicle brake pedal 16 is generally connected to a brake pedal switch 17 which connects the vehicle battery 22 through a fuse 23 to the brake lights 14, as known in the art. The brake indicating apparatus 10 allows standard operation of the brake lights 14 when there is no ABS engagement, but interrupts the power to provide flashing of the brake lights 14 when the braking conditions have surpassed a calibratable threshold.

Referring to FIGS. 1 and 2, the brake indicating apparatus 10 includes a warning module 24 for detecting engagement of the ABS 12 and for causing flashing of the brake lights 14 under prescribed conditions. An ABS input 26 of the warning module 24 senses ABS engagement or actuation which pumps the brakes during braking of the motor vehicle. An ABS signal is produced by the ABS 12 providing a pulsed signal to pump the brakes. A warning switch 28 receives a flash signal from the warning module 24 to temporarily interrupt power to the brake lights 14. This allows the brake lights 14 to be normally powered by the vehicle brake pedal 16 except in the condition that the warning module 24 is activated by the ABS 12. In the preferred embodiment, the warning switch 28 is a relay for causing interruption of power upon energization by the warning module 24. It should be appreciated that other types of switches may be utilized to interrupt power and cause flashing as desired.

The warning module 24 includes a delay circuit 30 for delaying activation of the warning switch 28 and therefore causing flashing of the brake lights 14 for a predetermined time after reception of the ABS signal and ABS 12 actuation. The delay circuit 30 includes a severity circuit 32 for counting the number of ABS actuations or pulses within a set period of time and for allowing activation of the warning switch 28 and flashing of the brake lights 14 only after a predetermined number of ABS actuations have been received within the set period of time.

More specifically, the delay circuit 30 includes an alarm-on counter 34 for counting the number of ABS actuations within the set period of time. The delay circuit 30 also includes a severity register 36 representative of an amount of ABS 12 actuation which need to occur prior to actuation of the warning switch 28 and flashing of the brake lights 14. A delay comparator 38 compares the alarm-on counter 34 to the severity register 36 to initiate flashing of the brake lights 14 by producing the flash signal to the warning switch 28. If the comparison is true, indicating an alarm or warning condition, an alarm flag 35 is set allowing flashing to occur.

The severity circuit 32 includes a first timer (1S-timer) flag 40 which is set at the start of receiving the ABS signal. The severity circuit 32 also includes a first counter (1S-counter) 42 to count the amount of time from setting the 1S-timer flag 40, for example, one second. The severity circuit 36 also includes a reset comparator 44 for comparing the 1S-counter 42 to a predetermined time to reset the alarm-on counter 34 and the 1S-timer flag 40 once the predetermined time has expired. In the preferred embodiment, the predetermined time of one (1) second is utilized, though it should be appreciated that other times may be utilized depending on the specific application.

The delay circuit 30 and severity circuit 32 operate to delay flashing of the brake lights 14 for a set time after initiation of the ABS 12, to ensure "continued" operation and duration of the ABS 12, and to omit short periods of flashing due to short moments of the ABS 12 engagement. The severity circuit 32 ensures that a certain amount of ABS signals or pulses are received to initiate the flashing, while the delay circuit 30 delays the flashing until the certain amount of ABS signals is received within the predetermined time while the ABS 12 continues to be actuated.

The warning module 24 further includes a time out circuit 46 for continuing activation of the warning switch 28 and flashing of the brake lights 14 for a predetermined time out time after absence of the ABS signal. The time out circuit 46 includes a delay-off counter 48 for counting the amount of time after the absence of the ABS signal, e.g. disengagement of the ABS 12. The time out circuit 46 also includes a time out register 50 to provide the predetermined time out time after absence of the ABS signal to continue actuation of the warning switch 28 and therefore flashing of the brake lights 14. If the pedal is still pressed by the operator, the time out circuit 40 also includes a time out comparator 52 for comparing the delay-off counter 48 to the time-out register 50 to discontinue flashing of the brake lights 14 and actuation of the warning switch 28 after expiration of the time out time. In other words, the brake lights 14 will continue to flash after a predetermined time delay when the ABS 12 has ceased to function. This will provide continued duration of flashing to warn following vehicles. It should be appreciated that the time out time may be any predetermined time.

The warning module 24 includes a flash circuit 54 which controls the flashing frequency of the brake lights 14 when actuated. It is desirable to flash the brake lights 14 at a speed which would be equivalent to the pumping rate on manual brakes. Too fast of a flash will distract following vehicles and too slow may not be capable of warning following vehicles. The flash rate is set by the flash rate register or variable 62, and an output compare timer 66 keeps track of the time to re-execute the flashing based on the flash rate register 62 as will be described with respect to FIG. 7. It should be appreciated that the flash rate is calibratable but never changes during normal operation.

The warning module 24 also includes a display 56 which is typically utilized only in testing and developing the warning module 24 to monitor delay time, flash rate, and time out quantity.

The variables of the time out register 50, severity register 36, and flash rate may be adjustable by the user or set in hard coding, as desired. The warning module 24 is a general purpose microcontroller. It should be appreciated that the components of the warning module 24 described herein along with their function may be implemented by other circuitry as will be known by one skilled in the art. The microcontroller is operated under a method or control as illustrated in the flowcharts of FIGS. 4 through 7.

Figure 3:
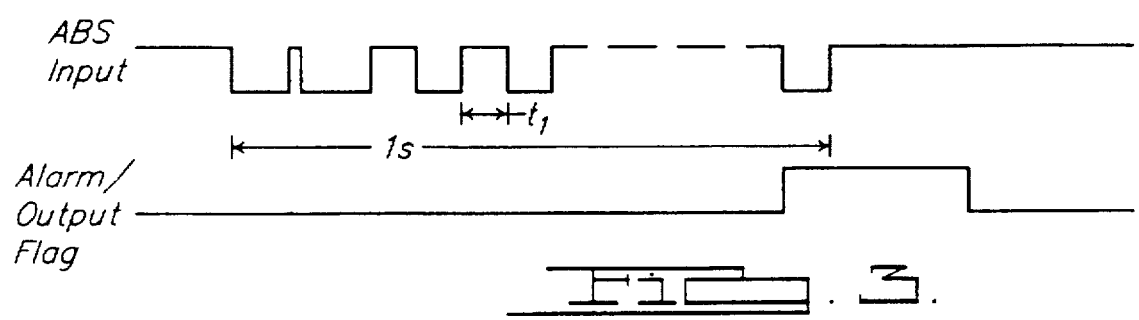
FIG. 3 is a timing diagram showing ABS actuation and alarm flag actuation.
Figure 3:
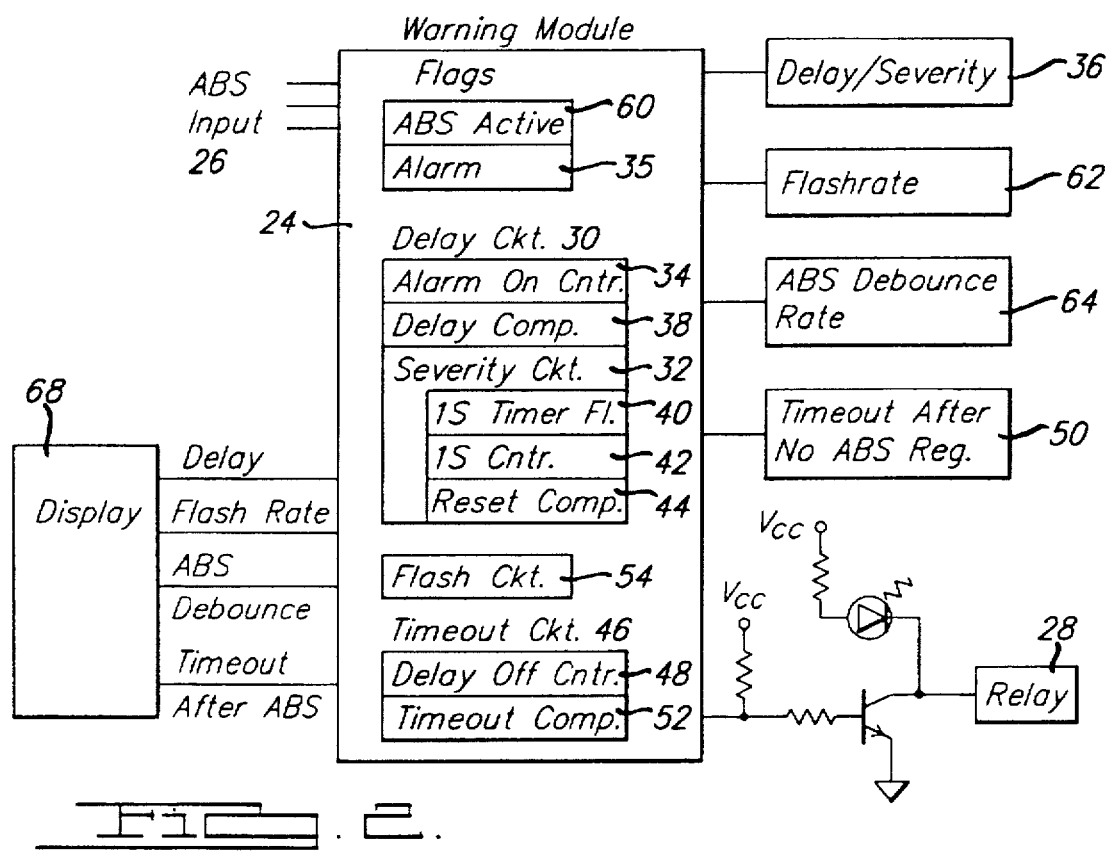

FIG. 3 illustrates the timing diagram of the ABS input 26 and the setting of the alarm flag 35 to initiate flashing of the brake lights 14.

Referring to FIGS. 4 through 7, a method, according to the present invention, of indicating braking or braking conditions of the brake indicating apparatus 10 is shown. The method includes the broad steps as follows, which is also supported by the more specific steps illustrated in the flowcharts. The method includes the step of detecting ABS actuation during braking of the vehicle and producing an ABS signal. The method also includes the step of receiving a flash signal and temporarily interrupting power to the brake lights 14 to provide flashing of the brake lights 14. The method includes the steps of receiving the ABS signal and activating the warning switch 28 and flashing of the brake lights 14, and delaying activation of the warning switch 28 and flashing of the brake lights 14 for a predetermined time after reception of the ABS signal. The method also includes the step of counting the number of ABS actuations within a set period of time and for activating the warning switch 28 and flashing of the brake lights 14 only after a predetermined number of ABS actuations have been received within the set period of time. The method further includes the step of continuing activation of the warning switch and flashing of the brake lights 14 for a predetermined time out time after absence of the ABS signal.

The method of delaying the activation of the warning switch 28 further includes counting the number of ABS actuations within a set period of time, storing an amount of ABS actuations which need occur prior to actuation of the warning switch 28 and comparing the counted number of ABS actuations to the stored number to initiate flashing of the brake lights 14 by producing the flash signal after the counted number equals or exceeds the stored number. The method also includes the steps of setting an ABS active flag 60, indicating the start of the ABS signal, counting the amount of time from setting of the ABS active flag 60, and comparing the counted time to the predetermined time to reset the counter for counting the number of ABS actuations when time has expired.

The step of continuing activation of the warning switch after the time out time further includes the steps of counting the amount of time after the absence of the ABS signal, storing a predetermined time for actuation of the warning switch 28 after absence of the ABS signal, and comparing the counted time to the stored time to discontinue flashing when the counted time exceeds or equals the stored time.

Figure 4:
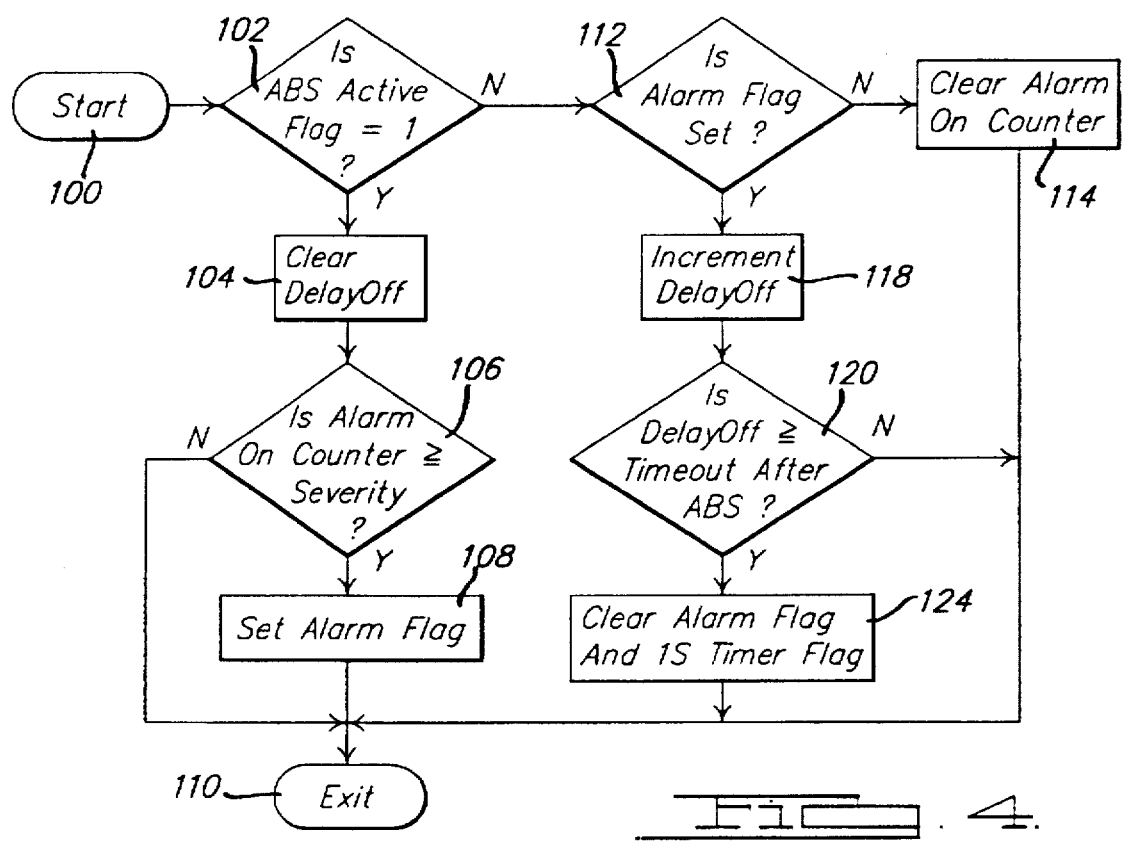
FIG. 4 is a flowchart of a method, according to the present invention, of operating the braking indicating apparatus of FIG. 1.

Referring to FIG. 4, the methodology starts in bubble 100 and advances to block 102 where the ABS active flag 60 is compared to see if it is set to a predetermined value such as one (1). The ABS active flag 60 indicates whether or not ABS 12 engagement and actuation has occurred. If the ABS active flag 60 is set (ABS 12 is active), the methodology advances to block 104 and clears the delay-off counter 48. The methodology advances to diamond 106 and compares the alarm-on counter 34 to the severity register 36 forming the delay comparator 38, and if exceeded, the methodology advances to block 108. In Block 108, the methodology sets the alarm-flag 35 to a predetermined value such as one (1) which indicates that alarm condition exists and that the delay has expired. This will also cause flashing of the brake lights 14 as subsequently described if the vehicle brake pedal is still depressed. Thereafter, the methodology advances to block 110 and exits.

If the alarm-on counter 34 does not exceed the severity register 36 in diamond 106, the methodology advances to bubble 110 and exits. This portion of the method provides the main function of the delay circuit 30.

If the ABS-active flag 60 is not set in diamond 102, the methodology advances to diamond 112 and determines whether the alarm-flag 35 is set. If the alarm-flag 35 is not set, the methodology advances to block 114 and clears the alarm-on counter 34. The methodology then advances to bubble 110 and exits. If the alarm flag 35 is set in diamond 112, the methodology advances to block 118 and increments the delay-off counter 48. Thereafter, the methodology advances to diamond 120 and a comparison is made to determine if the delay-off counter 48 is greater than or equal to the time out register 50 forming the time out comparator 52. If not, the methodology advances to bubble 110 and exits. If the comparison in diamond 120 is true, the methodology advances to block 124 and clears the alarm-flag and the 1S-timer flag 40. The methodology then advances to bubble 110 and exits. This establishes the main function of the time out circuit 46.

Figure 5:
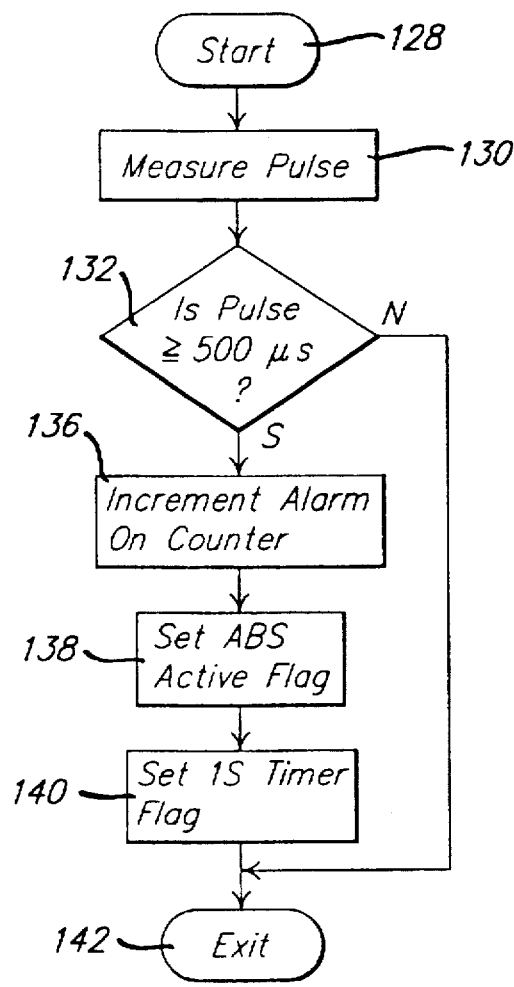
FIG. 5 is a flowchart of an input capture loop subroutine of the method.
Figure 6:
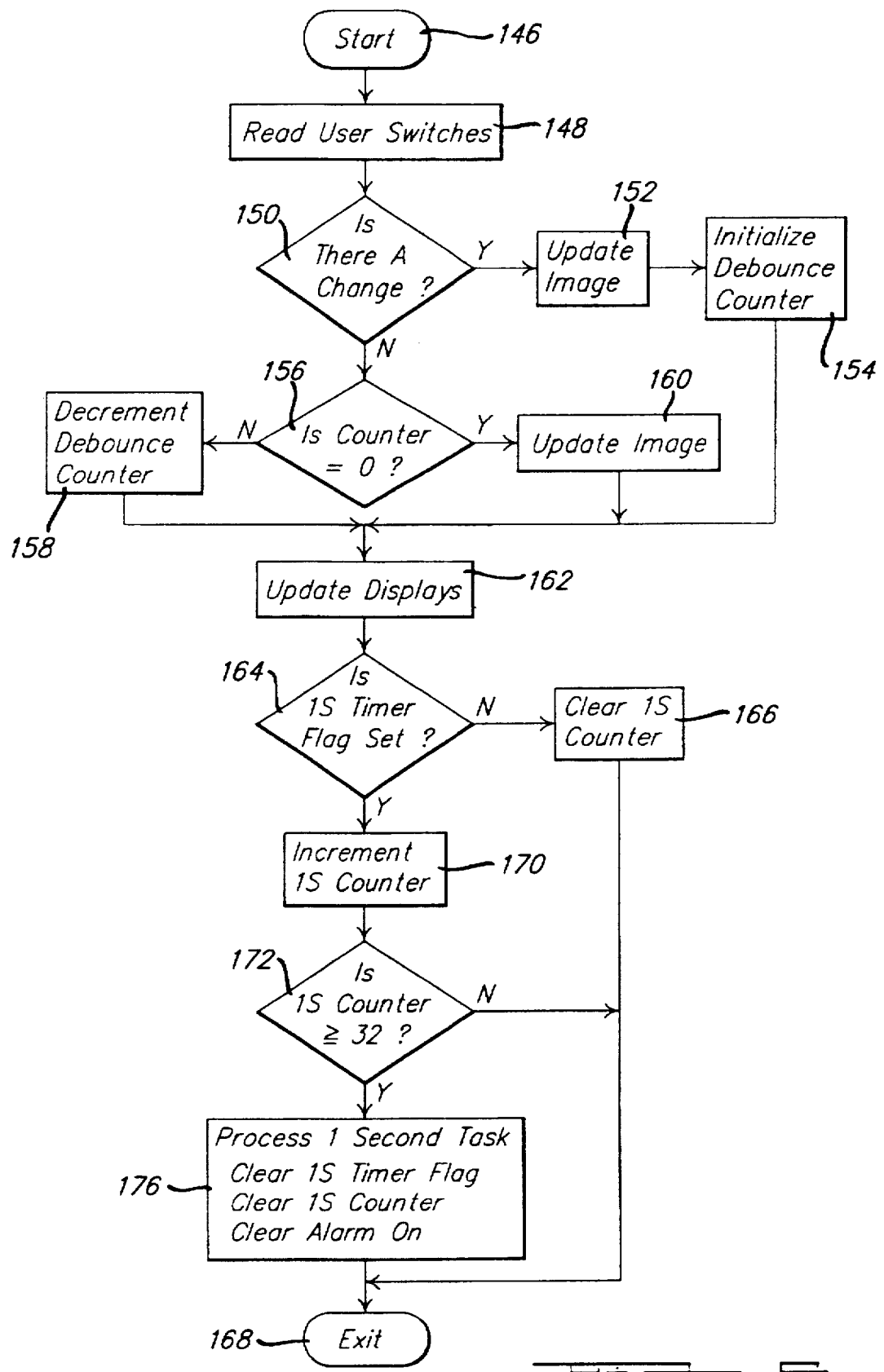
FIG. 6 is a flowchart of a timer task subroutine of the method.

FIG. 5 illustrates the input capture loop subroutine of the warning module 24 which operates upon an interrupt caused by a signal on the ABS input 26. The methodology starts in bubble 128 and advances to block 130 and thereafter measures the ABS signal. The methodology then advances to diamond 132 and a comparison is made to determine whether a received pulse signal is greater than or equal to a predetermined amount such as 500 µs. This number may be adjusted to eliminate noise and any other diagnostic signal on the ABS signal lines. This comparison will determine whether actual ABS actuation has occurred, or if a signal is just extraneous. If no ABS actuation has occurred, the methodology advances to bubble 142 and exits. If ABS actuation has occurred in bubble 132, the methodology advances to block 136 and increments the alarm-on counter 34, sets the ABS-active flag 60 in block 138, and sets the 1S-timer flag 40 in block 140, and then exits the routine in bubble 142. This routine establishes a portion of the severity circuit 32, along with the timer task subroutine (FIG. 6). It should be appreciated that the threshold value of 500 µs was chosen in the particular embodiment, but it should be appreciated that this value may be modified depending on the particular application.

FIG. 6 illustrates the timer task subroutine which executes every thirty-two milliseconds (32 msec.). The methodology starts in bubble 146 and advances to block 148. In block 148, the user variables are read. These variables are the severity 36, flashrate 62, ABS debounce rate 64, and time out register 50. In prototype or development equipment, the variables may be adjusted by an external circuit for testing purposes. However, once developed, the variables will be constant. Furthermore, the debounce rate 64 can be eliminated and incorporated by coding or circuitry to eliminate sensing of ABS solenoids switching by the warning module 24. The methodology advances to diamond 150 and a comparison is made to determine whether any changes have been made in the user variables. If changes have been made, the methodology advances to block 152 and updates the image. The methodology advances to block 154 and initializes a debounce counter 66. Otherwise, if there are no changes in block 150, the methodology advances to diamond 156 and the 1S counter is compared to see if zero. If not zero, the debounce counter 66 is decremented in block 158. If the 1S counter 42 is equal to zero, then the image is updated in block 160. The methodology advances from blocks 158, 160 or 154 to update the displays 68 in block 162. Displays 62 are utilized only during testing of the warning module 24 and are not utilized during normal product usage. The displays 62 merely provide information of the variables.

After block 162, the methodology advances to diamond 164 and, another comparison is made between the 1S-timer flag 40 to determine if set. If the 1S-timer flag is not set, the 1S-counter 42 is cleared in block 166 and the methodology advances to bubble 168 and exits. If the 1S-timer flag 40 is set, the 1S-counter 42 is incremented in block 170. Thereafter, the methodology advances to diamond 172 and the 1S-counter 42 is compared to determine if greater than or equal to 32 forming the reset comparator 44. If not, the methodology exits in bubble 168. If the 1S-counter 42 is greater than 32, the 1S-time flag 40, the 1S-counter 42 and the alarm-on flag 35 are all cleared in block 176 indicating the end of the set period of time. Therefore, if the number of ABS actuations occurring prior to expiration of the set time does not exceed the severity register 36, then no alarm flag 35 will be set and no flashing of the brake light relay occurs. The methodology advances to bubble 168 and exits.

Figure 7:
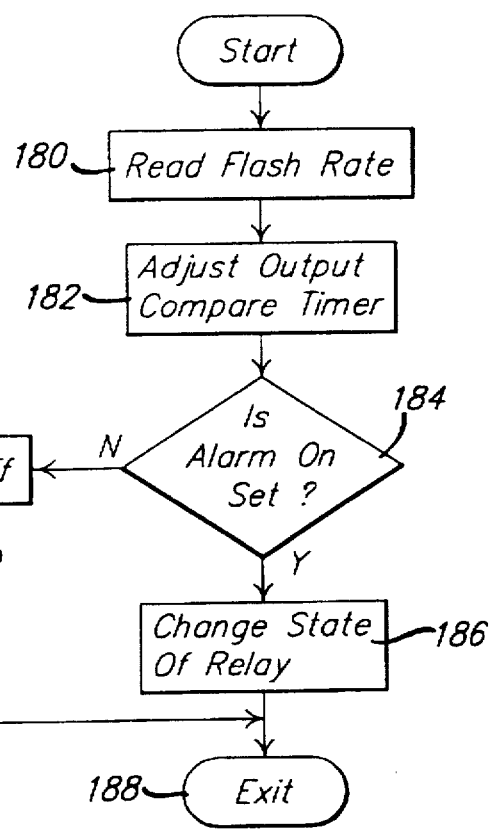
FIG. 7 is a flowchart of a flashing subroutine of the method.

FIG. 7 illustrates the flashing subroutine of the method. In block 180, the flash rate register 62 is read and the output compared time 66 is adjusted in block 182. In diamond 184, the methodology determines if the alarm-on flag 35 is set. If the alarm-on flag 35 is set, the state of the relay of the warning switch 28 is changed in block 186 and the methodology exits in bubble 188. If the alarm-on flag 35 is not set, the relay of warning switch 28 is turned off in block 190 and the methodology exits in bubble 188.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A brake indicating apparatus for indicating braking of a vehicle having an anti-lock braking system (ABS) and brake lights powered upon actuation of a vehicle brake pedal comprising:

ABS input for sensing ABS actuation during braking of a vehicle and for producing an ABS signal;

a warning switch for receiving a flash signal and for temporarily interrupting power to the brake lights;

a warning module for receiving the ABS signal and for producing the flash signal to activate the warning switch; and said warning module including a delay circuit and a severity circuit for delaying activation of said warning switch for a predetermined time after reception of the ABS signal.

2. A brake indicating apparatus as set forth in claim 1 wherein said delay circuit includes an alarm-on counter for counting the number of ABS actuations within a set period of time.

3. A brake indicating apparatus as set forth in claim 2 wherein said delay circuit includes a severity register representative of an amount of ABS actuations which need to occur prior to actuation of said warning switch.

4. A brake indicating apparatus as set forth in claim 3 wherein said delay circuit includes a delay comparator for comparing said alarm-on counter to said severity register to initiate flashing of the brake lights by producing the flash signal.

5. A brake indicating apparatus as set forth in claim 4 wherein said severity circuit includes a first timer flag which is set at the start of receiving the ABS signal.

6. A brake indicating apparatus as set forth in claim 5 wherein said severity circuit includes a first counter to count the amount of time from setting of said first timer flag.

7. A brake indicating apparatus as set forth in claim 6 wherein said severity circuit includes a reset comparator for comparing said first counter to a predetermined time to reset said alarm-on counter and said first timer flag.

8. A brake indicating apparatus as set forth in claim 1 wherein said warning module includes a time out circuit for continuing activation of said warning switch for a predetermined time after absence of the ABS signal.

9. A brake indicating apparatus as set forth in claim 8 wherein said time out circuit includes a delay-off counter for counting the amount of time after the absence of the ABS signal.

10. A brake indicating apparatus as set forth in claim 9 wherein said time out circuit includes a time out register to provide a predetermined time for actuation of said warning switch after the absence of the ABS signal.

11. A brake indicating apparatus as set forth in claim 10 wherein said time out circuit includes a time out comparator for comparing said delay-off counter to said time out register to discontinue flashing of the brake lights.

12. A method of indicating braking of a vehicle having an anti-lock braking system (ABS) and brake lights powered upon actuation of a vehicle brake pedal including the steps of:

detecting ABS actuation during braking of the vehicle; and flashing the brake lights only if a predetermined number of ABS actuations are received within a set time period.

13. A method as set forth in claim 12 including the step of continuing flashing the brake lights a predetermined amount of time after cessation of said ABS actuation.

14. A method as set forth in claim 13 including the step of counting a number of ABS actuations within the set period of time.

15. A method as set forth in claim 14 including the step of storing an amount of ABS actuation's which need to occur prior to flashing the brake lights.

16. A method as set forth in claim 15 including the step of comparing the counted number of ABS actuations to the stored ABS actuations to initiate flashing of the brake lights when the counted number exceeds the stored amount.

17. A method as set forth in claim 15 wherein ABS actuation is determined by the ABS system whereas wheel speed deceleration is monitored and compared on an individual basis.

18. A brake indicating apparatus as set forth in claim 12 and further including the step of delaying flashing of the brake lights for a predetermined time after detection of said ABS actuation.

19. A brake indicating apparatus for indicating braking of a vehicle having an anti-lock braking system (ABS) and brake lights powered upon actuation of a vehicle brake pedal comprising:

an ABS input for sensing ABS actuation during braking of a vehicle and for producing an ABS signal;

a warning module for receiving the ABS signal and for producing an intermittent flash signal only after a predetermined number of ABS actuation's are received within a set period of time; and a warning switch for receiving a flash signal and temporarily interrupting power to the brake lights in response to the flash signal.

* * * * *